United States Patent [19]
Lee

[11] Patent Number: 5,946,505
[45] Date of Patent: Aug. 31, 1999

[54] FINDER SYSTEM FOR A SINGLE LENS REFLEX CAMERA

[75] Inventor: Chun-Gon Lee, Seongnam-si, Rep. of Korea

[73] Assignee: Samsung Aerospace Industries, Ltd., Changwon, Rep. of Korea

[21] Appl. No.: 09/049,968

[22] Filed: Mar. 27, 1998

[30] Foreign Application Priority Data

Mar. 28, 1997 [KR] Rep. of Korea ................ 97-11218

[51] Int. Cl.⁶ .................... G03B 13/08; G02B 25/00
[52] U.S. Cl. .................. 396/152; 396/382; 396/386; 359/646
[58] Field of Search ................. 396/152, 150, 396/148, 382, 385, 386, 373; 359/646, 645, 810, 730

[56] References Cited

U.S. PATENT DOCUMENTS

| | | | |
|---|---|---|---|
| 3,587,383 | 6/1971 | Ikezu | 396/382 |
| 4,437,750 | 3/1984 | Ikari | 396/382 |
| 4,593,984 | 6/1986 | Kimura et al. | 396/382 |
| 5,066,115 | 11/1991 | Sugawara | 396/382 X |
| 5,136,427 | 8/1992 | Sugawara | 359/646 |

*Primary Examiner*—W. B. Perkey
*Attorney, Agent, or Firm*—Howrey & Simon

[57] ABSTRACT

A finder system for a single lens reflex camera includes a focusing screen having a split prism, a penta roof mirror and an eyepiece lens system. The penta roof mirror has a hollow housing made of plastic material in the shape of a pentagonal prism whose three surfaces are coated inside to reflect light. The eyepiece lens system includes two plastic lenses, each of which has a different dispersion.

5 Claims, 11 Drawing Sheets

FINDER SYSTEM FOR A SINGLE LENS REFLEX CAMERA

BACKGROUND OF THE INVENTION (a) Field of the Invention

The present invention relates to a finder system for a camera and, more particularly, to a finder system for a single lens reflex camera using a group of plastic lenses for an eyepiece and a penta roof mirror.

(b) Description of the Related Art

A finder system for a single lens reflex camera generally requires a high quality view and high magnification. At the same time, in the non-professional camera market, cost reduction is also important.

In order to obtain a high magnification, a finder system uses a compact penta roof prism and reduces a focal length of an eyepiece. However, a shortened focal length of the eyepiece makes it difficult to compensate for aberrations such as astigmatism and distortion.

Plastic lenses may be used to lower manufacturing cost, but they cannot easily compensate for spherical aberration and distortion because they have a lower refractive index than that of glass which is generally used in an eyepiece.

A conventional single lens reflex camera uses a penta roof prism to provide an eyepiece with an image that is formed on the focusing screen when light passes through the camera's lens system and is reflected by the revolving reflective mirror. A penta roof prism in a single reflex camera inverts an image horizontally through the eyepiece. But the penta roof prism causes a camera to be heavy, which is against the current trend of compact and light-weight cameras.

SUMMARY OF THE INVENTION

In view of the prior art described above, it is an object of the present invention to provide a finder system for a single lens reflex camera using a plastic lens as an eyepiece and using a penta roof mirror instead of a penta roof prism in order to reduce cost and weight.

It is another object of the present invention to provide a finder system having a diopter correcting lens so that a user may view an object in accordance with the user's eyesight.

In order to achieve these objects, the present invention includes a focusing screen with a centered split prism on which an image of the object is formed, a penta roof mirror that reflects the image on the split prism to the eyepiece, and an eyepiece lens system.

Also, to achieve these objects, the present invention provides an eyepiece lens system including a first lens having a negative refractive power and having a concave surface toward an eye side; and a second lens having a positive refractive power and having a convex surface toward the penta roof mirror. The eyepiece lens system satisfies the following conditions:

$29 < v_N < 33$ $55 < v_P < 60$ where $v_N$ represents an Abbe number of the first lens; and $v_P$ represents an Abbe number of the second lens.

Also, to achieve these objects, the present invention provides a finder system further including a diopter correcting lens.

Both the foregoing general description and the following Detailed Description are exemplary and are intended to provide an explanation of the invention as claimed.

BRIEF DESCRIPTION OF THE DRAWINGS

The accompanying drawings provide a further understanding of the invention and, together with the Detailed Description, explain the principles of the invention. In the drawings.

DETAILED DESCRIPTION OF THE PREFERRED EMBODIMENTS

The present invention will be described in detail with reference to the accompanying drawings.

Figure 1:
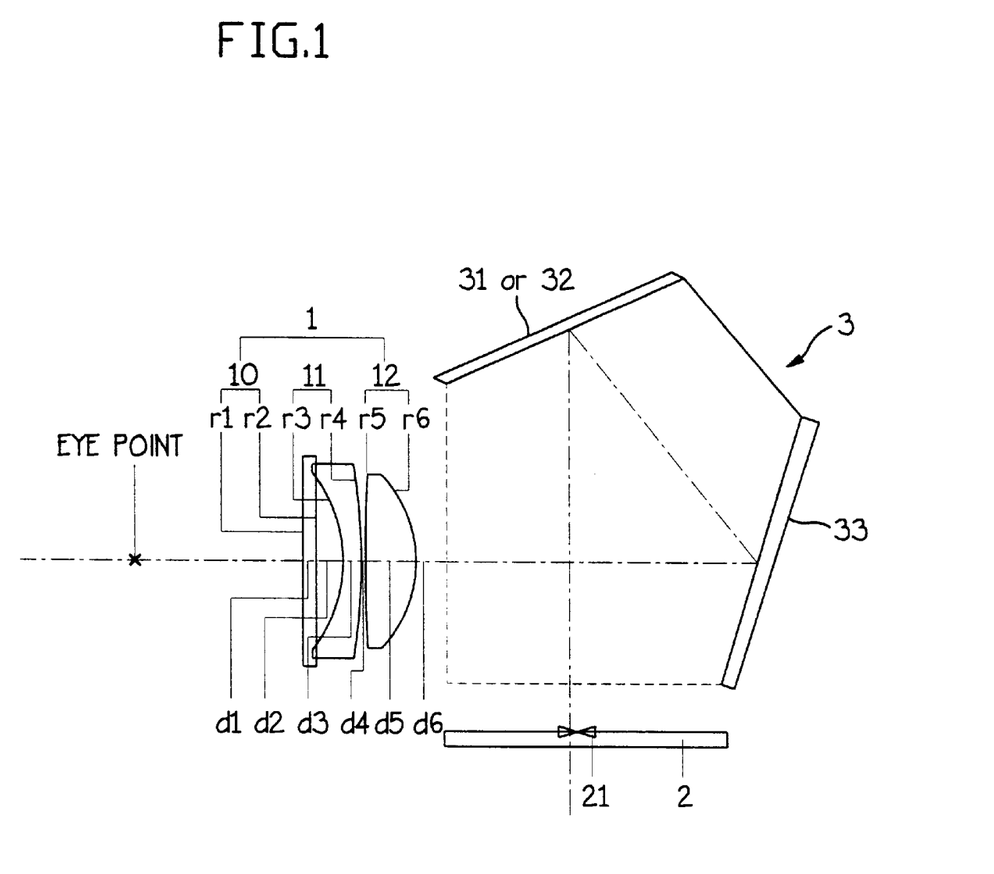
FIG. 1 is a sectional view of a finder system according to the present invention.

Referring to FIG. 1, a finder system according to the present invention comprises a focusing screen 2 having a split prism 21 at its center, a penta roof mirror 3 and an eyepiece 1. A photographic lens of a single lens reflex camera (not shown) forms an image of an object on the focusing screen 2. The image formed on the focusing screen 2 is inverted by 180 degrees to a horizontal direction. The split prism 21 is composed of two semicircle type prisms and is used for focusing adjustment.

Figure 11:
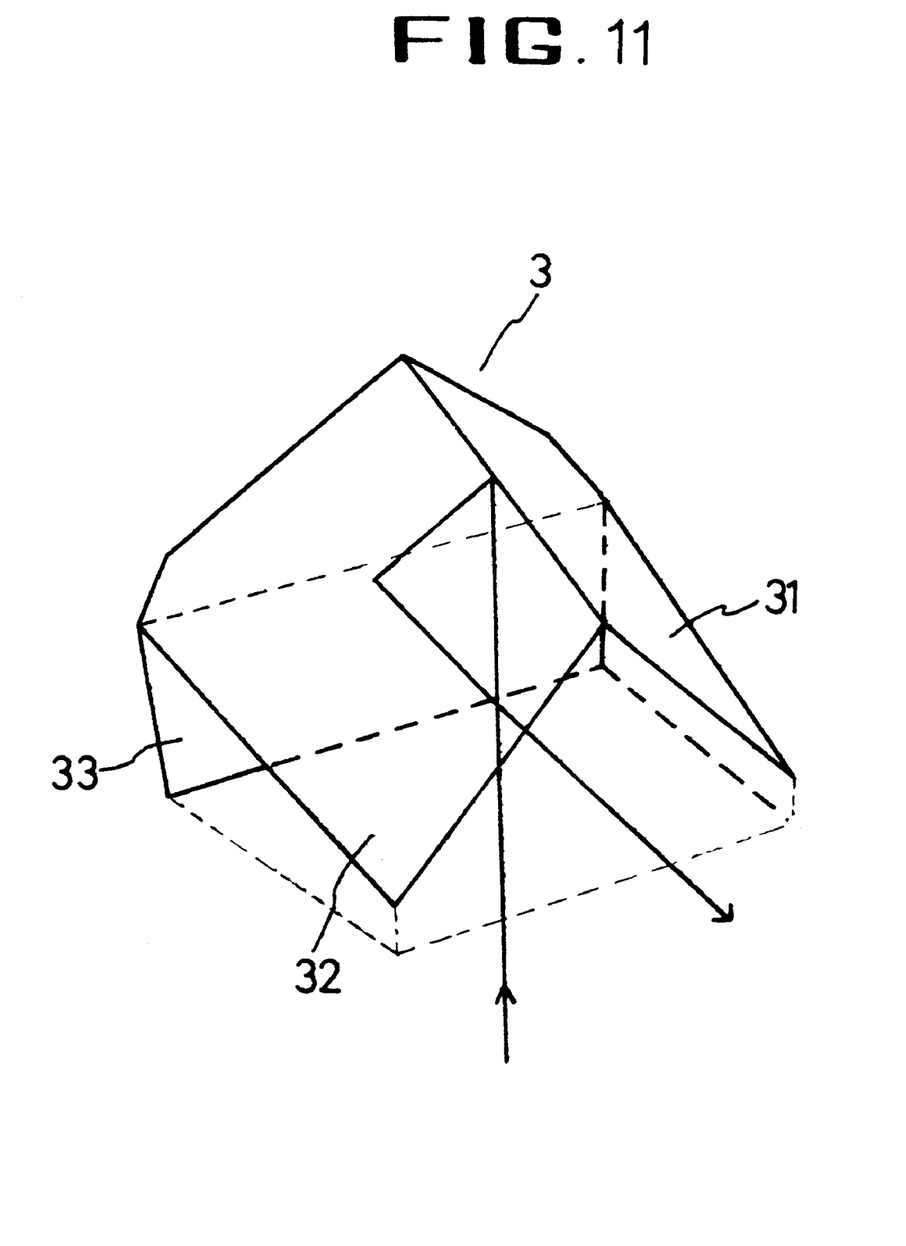
FIG. 11 is a perspective view of a penta roof mirror, in accordance with the present invention.

The penta roof mirror 3 is a hollow plastic housing in the shape of a conventional penta roof prism (pentagonal prism), as shown in FIG. 11. Generally, a conventional penta roof mirror for use in the view finder includes three refection surfaces. The penta roof mirror 3 has also three reflection surfaces 31, 32 and 33, all of which are coated inside with metallic film for reflection. The penta roof mirror is provided with three reflection surfaces and a surface connected therebetween. It is possible to provide the penta roof mirror to pierce out an entrance surface and an exit surface in a hollow pentagonal housing so as to receive the image from the focusing screen 2 and reflect it to the eyepiece 1.

The penta roof mirror 3 reflects the image focused on the focusing screen 2, and outputs it to the eyepiece 1, which is perpendicular to the focusing screen. Thus, the image reflected from the penta roof prism 3 is reversed and finally erected in the horizontal direction.

The eyepiece 1 receives the reflected image and enables a user to view the object. The eyepiece 1 comprises a first lens 11 of a negative refractive power and a second lens 12 of a positive refractive power. The first lens 11 has a concave surface toward the penta roof mirror and the second lens 12 has a convex surface toward the penta roof mirror. In the preferred embodiment, the first lens 11 is made of polystyrene and the second lens is made of acrylic resin. Other suitable compositions may also be employed. The first lens 11 and the second lens 12 preferably have at least one aspherical surface, respectively.

The eyepiece further comprises a protection lens 10 which is mounted in front of the first lens 11. The protection lens 10 protects the first and second lenses 11, 12 from external dust or a user's touch. The protection lens 10 may have flat parallel surfaces so that it does not affect the characteristics of the eyepiece.

Figure 4:
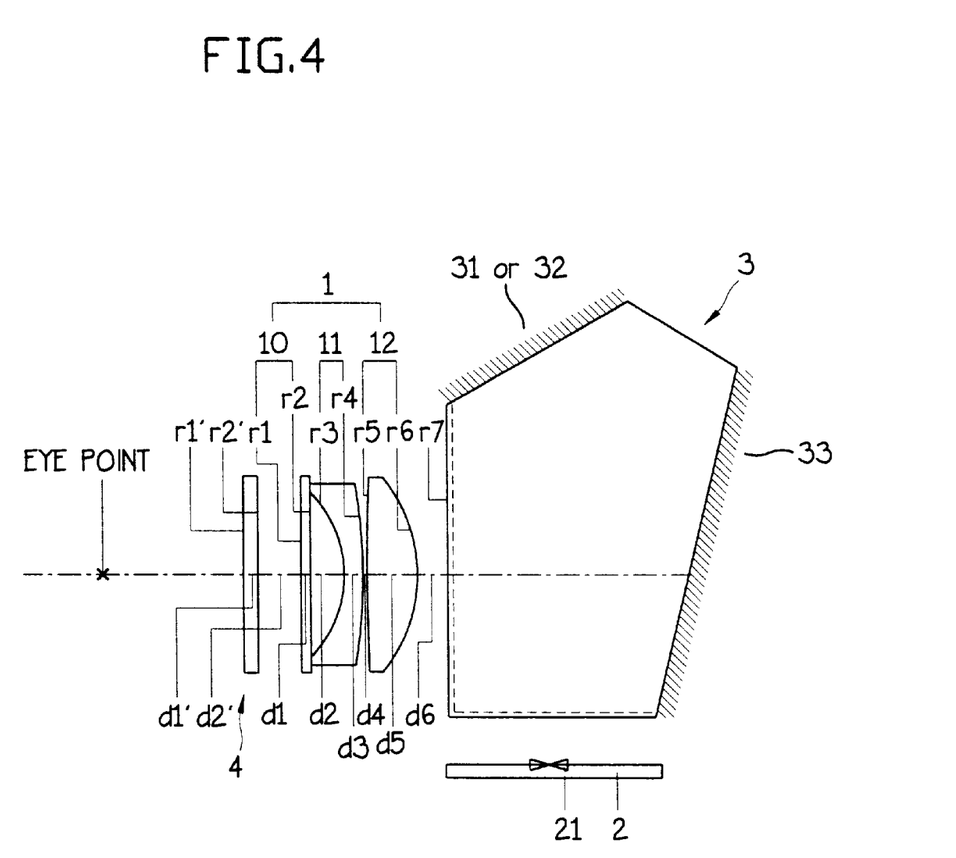
FIG. 4 is a sectional view of a finder system with a diopter correcting lens according to a third preferred embodiment of the present invention.

An eyepiece 1 of the first or second preferred embodiment is designed for −1 diopter. The third preferred embodiment consistent with the present invention further comprises a diopter correcting lens 4 in front of the eyepiece 1, as shown in FIG. 4. The diopter correcting lens 4 for −2, −3, 0, +1 or +2 diopter is attachable.

In this embodiment of the present invention, a penta roof mirror replaces a conventional penta roof prism in order to reduce the weight and cost of a camera, which also changes the focal length of the eyepiece lens system. A conventional penta roof prism has an optical path length ranging from 70 to 75 mm and renders a eyepiece lens system with a focal length of about 60 mm.

If a penta roof mirror is used according to the embodiment, instead of a conventional penta roof prism, the optical path length inside the penta roof mirror compartment of the finder system becomes 46.15 to 49.45 when the prism is assumed to be made of BK7. The optical path length in air of a penta roof prism, when the optical path in the prism is given, can be calculated as follows:

$$\text{Optical path length } (D) = \frac{\text{optical path in prism}}{\text{refractive index of prism } (BK7)}$$

$$= \frac{70 \text{ mm}}{1.5168} = 46.15 \text{ mm}$$

Thus, a conventional penta roof prism can be used to lengthen an optical path, if necessary, when the eyepiece lens system that is employed has a short focal length. However, the penta roof prism also increases the weight of the camera.

In this embodiment, a penta roof mirror is used to reduce cost and weight. However, when a penta roof mirror is used, it is required to lengthen an optical path, for example, from 46.15 mm to 70 mm by employing an eyepiece lens system with a longer focal length to achieve the same effect as when a penta roof prism is used. The eyepiece lens system with a longer focal length renders a lower magnification ratio, but it does not affect the performance of the view finder recognizably. Therefore, the benefit from the reduction of the cost and weight outweighs any disadvantages of a lower magnification ratio.

In this embodiment of the present invention, the focal length of the eyepiece lens system is 71.43 mm, while that of the eyepiece lens system using a conventional penta roof prism is about 60 mm. Therefore, the magnification of the present eyepiece lens system according to the present invention is lower than that of the eyepiece lens system using a penta roof prism, but the present invention has an advantage of reduced weight and lower cost.

In order to meet these objects, the eyepiece lens system should satisfy the following conditions:

(1) $29 < v_N < 33$ and
(2) $55 < v_P < 60$ where $v_N$ represents the Abbe number of the first lens 11 and $v_P$ represents the Abbe number of the second lens 12 in FIG. 1. In order to eliminate aberrations, the eyepiece lens system satisfies the following conditions, in addition to the above conditions (1) and (2):

(3) $-10.0 < k1 < -9.0$  $k1 = (1/r_3 + 1/r_6) \times f$; and
(4) $1.5 < k2 < 1.7$  $k2 = (|1/r_5 - 1/r_6|)/(|1/r_3 - 1/r_4|)$ where f represents an effective focal length of the eyepiece, and each of $r_3$, $r_4$, $r_5$ and $r_6$ represents the radius of the curvature of lens surfaces of the first and second lenses 11, 12 in order from the eye point, as depicted in FIG. 1.

Conditions (1) and (2) relate to the dispersion of two lenses of the eyepiece lens system. In order to eliminate chromatic aberration, the first lens 11 of the eyepiece 1 in FIG. 1 is made of a material with a different dispersion from the material that is used for the second lens 12 of the eyepiece 1 in FIG. 1. For example, when the positive second lens 12 in FIG. 1 is composed of a low dispersive material, whose Abbe number ranges from 55 to 60, the negative first lens 11 in FIG. 1 is composed of a high dispersive material to compensate for the chromatic aberration.

Condition (3) relates to spherical aberration and astigmatism of the eyepiece lens system. When k1 is within the range of condition (3), the system is free from spherical aberration and astigmatism, as shown in FIG. 2. If k1 is below the lower limit in condition (3), negative astigmatism increases rapidly and positive distortion cannot be eliminated. If k1 is above the upper limit in condition (3), positive spherical aberration also becomes great.

Condition (4) relates to chromatic aberration that affects the measurement of the distance to an object and the focus adjustment. As described above, if $r_3$ and $r_6$ of the eyepiece lens system satisfy condition (3) and the lens with a positive refractive power is made of a material with an Abbe number of 57.5 and the lens with a negative refractive power is made of a material with an Abbe number of 29.9, k2 should be approximately 1.59 in order to compensate for chromatic aberrations. If k2 is greater than the upper limit in condition (4), it is difficult to compensate the on-axis chromatic aberration. And if k2 is below the lower limit in condition (4), it tends to over-compensate the on-axis chromatic aberration.

Data which satisfies the above-mentioned conditions (1) to (4), according to preferred embodiments of the invention, are shown in the Tables below. All dimensions given in the tables are in millimeters, and the following variables are used:

ri (i=1 to 6) represents a radius of curvature as illustrated in FIG. 1;

di (i=1 to 6) represents a thickness of a lens or a distance between surfaces as illustrated in FIG. 1;

nd represents the d-line refractive index of a lens; and v represents the Abbe number of a lens.

The aspherical coefficients (A, B, C, D) set forth in the tables are for use in the following equation:

$$z = \frac{cy^2}{1 + [1-(1+K)c^2y^2]^{1/2}} + Ay^4 + By6 + Cy8 + Dy10$$

where z is the surface sag at a distance y from the optical axis of the system, c is the base curvature of the lens at the optical axis, and K is a conic constant for the lens system.

Data for the first preferred embodiment of the present invention (see FIG. 1) is shown in Table 1, where the effective focal length of the first preferred embodiment is 71.43 mm and the viewing angle is 15.27°.

TABLE 1

| Surface No. | Radius of Curvature (r) | Distance (d) | Refractive Index (Nd) | Abbe Number ($\upsilon$) |
|---|---|---|---|---|
| 1 | ∞ | 1.5 | 1.517 | 64.2 |
| 2 | ∞ | 3.0 | | |
| *3 | −17.572 | 2.0 | 1.585 | 30.9 |
| 4 | −77.644 | 0.5 | | |
| 5 | 2505.550 | 5.57 | 1.492 | 57.5 |
| *6 | −14.357 | 82.14 | | |

*represent an aspherical surface.

According to the first preferred embodiment of the present invention, spherical surfaces are described using the aspherical coefficients in Table 2.

TABLE 2

| | Aspherical Coefficient of the Third Surface | Aspherical Coefficient of the Sixth Surface |
|---|---|---|
| K | 2.2966 | −0.1576 |
| A | 0.8427E − 5 | −0.7759E − 5 |
| B | −0.1061E − 5 | −0.3090E − 6 |
| C | 0.2121E − 7 | 0.2225E − 8 |
| D | −0.1142E − 9 | −0.8809E − 11 |

Figure 2A:
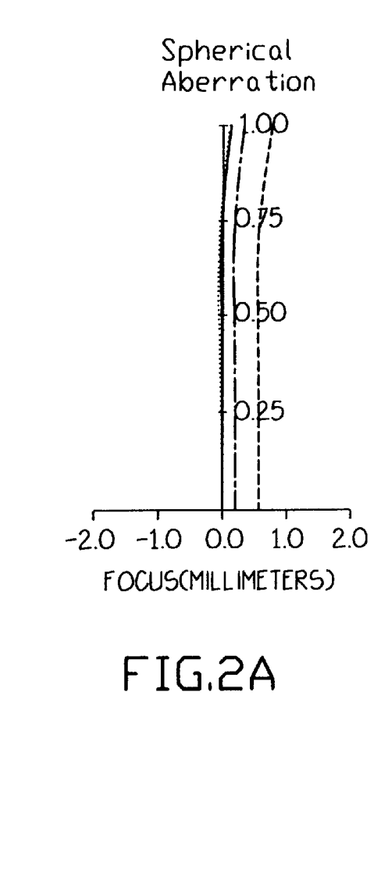
FIGS. 2A to 2C show the aberration curves of a finder system, in accordance with a first embodiment of the present invention.
Figure 2B:
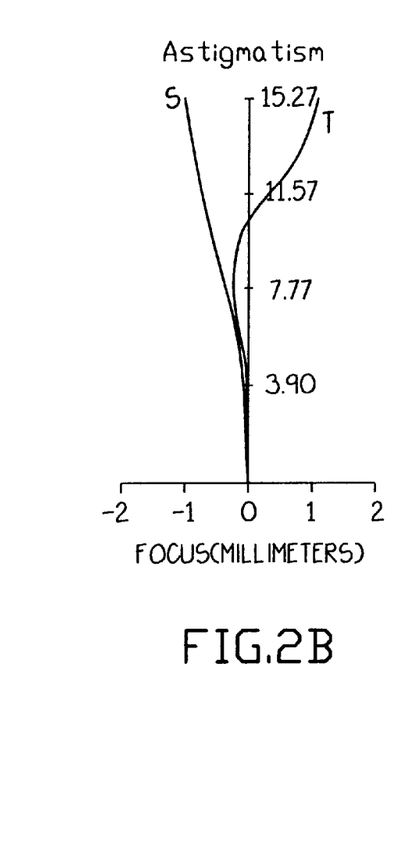
Figure 2C:
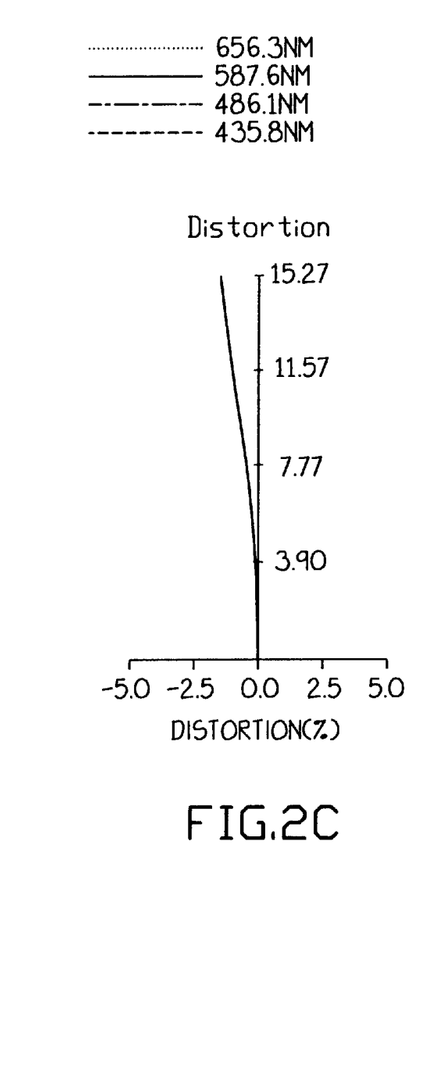

FIGS. 2A to 2C illustrate the aberration characteristics such as spherical aberration, astigmatism and distortion, respectively, of the first preferred embodiment.

Data for the second preferred embodiment of the present invention (see FIG. 1) is shown in Table 3, where the effective focal length of the first preferred embodiment is 71.43 mm and the viewing angle is 15.27°.

TABLE 3

| Surface No. | Radius of Curvature (r) | Distance (d) | Refractive Index (Nd) | Abbe Number ($\upsilon$) |
|---|---|---|---|---|
| 1 | ∞ | 1.5 | 1.517 | 64.2 |
| 2 | ∞ | 3.0 | | |
| *3 | −17.572 | 2.36 | 1.585 | 30.9 |
| 4 | −75.930 | 5.14 | | |
| 5 | ∞ | 7.5 | 1.492 | 57.5 |
| *6 | −14.357 | 84.07 | | |

*represent an aspherical surface.

According to the second preferred embodiment of the present invention, the aspherical surfaces are described using the aspherical coefficients shown in Table 4.

TABLE 4

| | Aspherical Coefficient of the Third Surface | Aspherical Coefficient of the Sixth Surface |
|---|---|---|
| K | 2.5922 | −0.1576 |
| A | 0.1370E − 5 | −0.7759E − 5 |
| B | −0.8015E − 6 | −0.3090E − 6 |
| C | 0.1525E − 7 | 0.2225E − 8 |
| D | −0.1919E − 10 | −0.8809E − 11 |

Figures 3A, 3B:
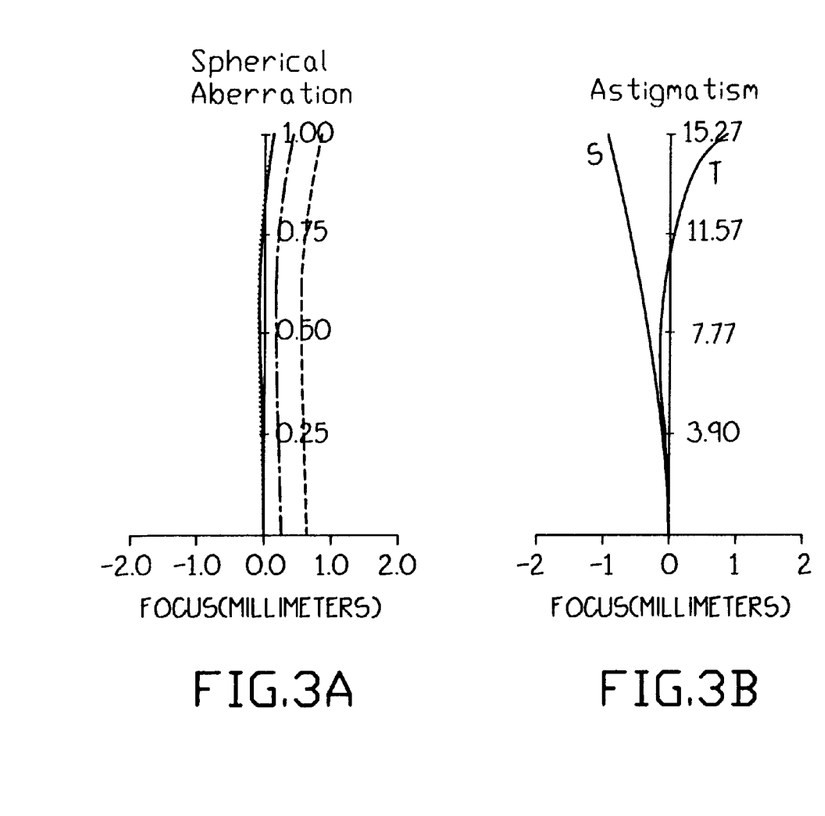
FIGS. 3A to 3C show the aberration curves of a finder system, in accordance with a second embodiment of the present invention.
Figure 3C:
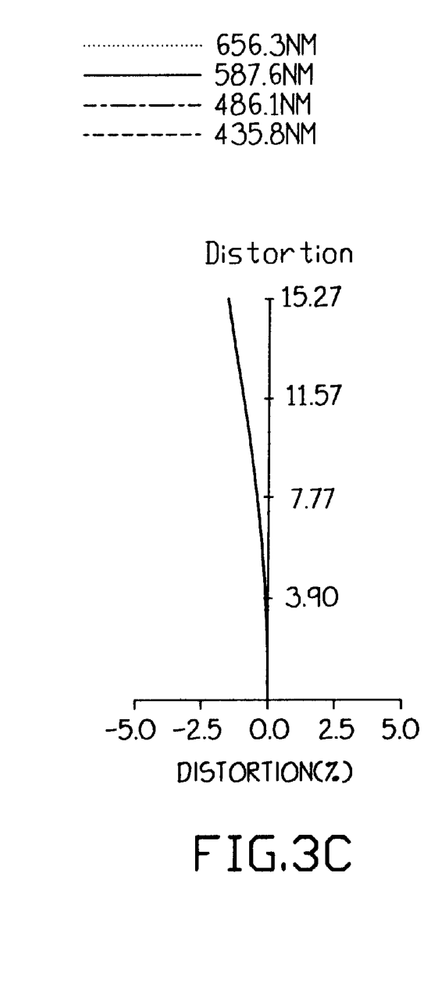

FIGS. 3A to 3C illustrate the aberration characteristics such as spherical aberration, astigmatism and distortion, respectively, of the second preferred embodiment.

Now, referring to FIGS. 1 and 4, the third preferred embodiment of the present invention will be explained.

A finder system according to the third preferred embodiment further comprises a diopter correcting lens 4 in front of the eyepiece 1. A user may attach the diopter correcting lens 4 to correct the user's eyesight, when necessary. A finder system according to the first or second preferred embodiment is designed for −1 diopter since many users fall into this category.

A conventional finder system generally includes an eyepiece having a focal length of 60 mm so that diopter movement for the eyepiece is about 3.6 mm. Therefore, a user whose eyesight ranges from −2 to +2 may use the conventional finder system without any problems. However, the embodiments according to the present invention include an eyepiece having a focal length of 70–75 mm so that diopter movement for the eyepiece becomes about 4.9–6.2 mm which is longer than that of the conventional finder system. Therefore, it is preferable to use a diopter correcting lens.

Table 5 shows data for the third preferred embodiment for −1 diopter, which does not include a diopter correcting lens 4, as shown in FIG. 1. The effective focal length of the third preferred embodiment for −1 diopter is 71.43 mm and the viewing angle is 16.01°.

TABLE 5

| Surface No. | Radius of Curvature (r) | Distance (d) | Refractive Index (Nd) | Abbe Number ($\upsilon$) |
|---|---|---|---|---|
| 1 | ∞ | 1.000 | 1.516 | 64.2 |
| 2 | ∞ | 3.500 | | |
| *3 | −17.599 | 2.000 | 1.585 | 30.9 |
| 4 | −75.924 | 0.500 | | |
| 5 | ∞ | 5.600 | 1.492 | 57.5 |
| *6 | −14.355 | 3.000 | | |

*represents an aspherical surface.

According to the third preferred embodiment of the present invention, the aspherical surfaces are described using the aspherical coefficients shown in Table 6.

TABLE 6

| | Aspherical Coefficient of the Third Surface | Aspherical Coefficient of the Sixth Surface |
|---|---|---|
| K | 2.5922 | −0.1576 |
| A | 0.1370E − 4 | −0.7759E − 5 |
| B | −0.8015E − 6 | −0.3090E − 6 |
| C | 0.1525E − 7 | 0.2225E − 8 |
| D | −0.1919E − 10 | −0.8809E − 11 |

Figure 5A:
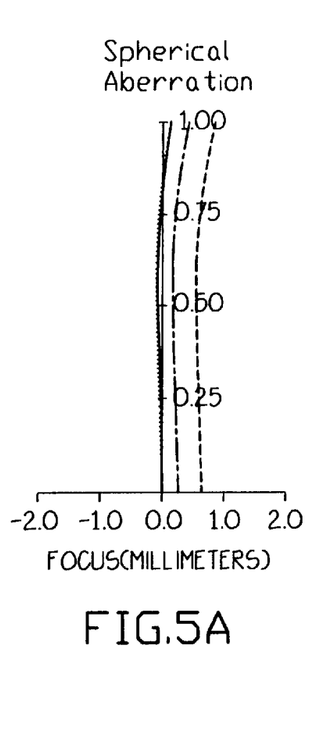
FIGS. 5A to 5C show the aberration curves of a finder system for −1 diopter, in accordance with the third embodiment of the present invention.
Figure 5B:
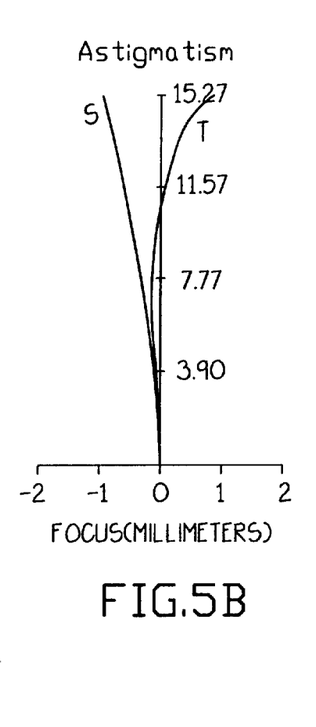
Figure 5C:
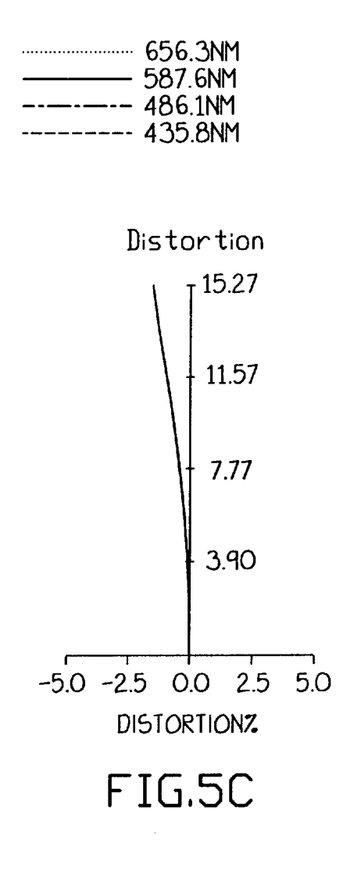

FIGS. 5A to 5C illustrate the aberration characteristics such as spherical aberration, astigmatism and distortion, respectively, of the third preferred embodiment for −2 diopter.

Data for the third preferred embodiment which includes a diopter correcting lens 4 for −2 diopter (see FIG. 4) is shown in Table 7, where the effective focal length is 74.78 mm and the viewing angle is 15.33°.

TABLE 7

| Surface No. | Radius of Curvature (r) | Distance (d) | Refractive Index (Nd) | Abbe Number ($\upsilon$) |
|---|---|---|---|---|
| 1' | ∞ | 1.300 | 1.492 | 57.5 |
| 2' | 522.23976 | 5.600 | | |
| 1 | ∞ | 1.000 | 1.516 | 64.2 |
| 2 | ∞ | 3.500 | | |
| *3 | −17.599 | 2.000 | 1.585 | 30.9 |

TABLE 7-continued

| Surface No. | Radius of Curvature (r) | Distance (d) | Refractive Index (Nd) | Abbe Number ($v$) |
|---|---|---|---|---|
| 4 | −75.924 | 0.500 | | |
| 5 | ∞ | 5.600 | 1.492 | 57.5 |
| *6 | −14.355 | 3.000 | | |

*represents an aspherical surface.

According to the third preferred embodiment for −2, −3 0, +1 or +2 diopter, the aspherical surfaces are described using the aspherical coefficients shown in Table 6.

Figure 6A:
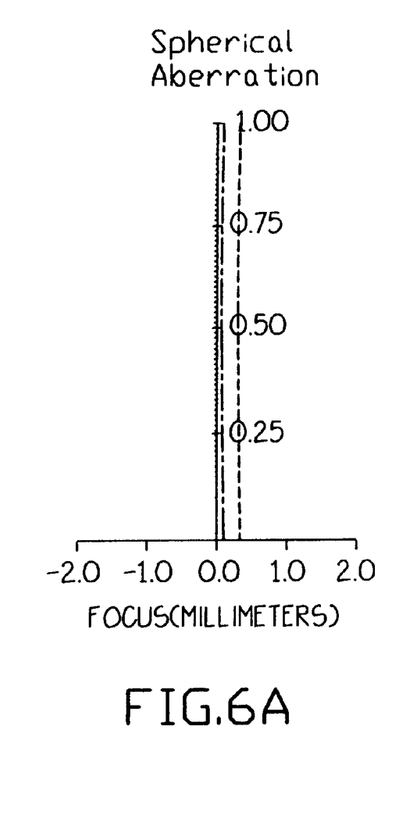
FIGS. 6A to 6C show the aberration curves of a finder system for −2 diopter, in accordance with the third embodiment of the present invention.
Figure 6B:
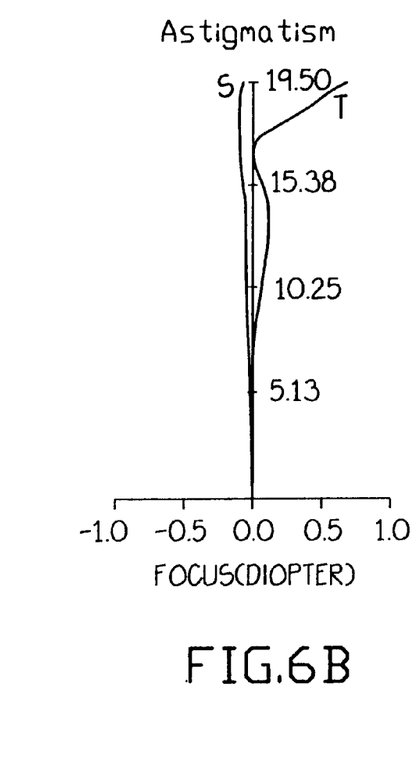
Figure 6C:
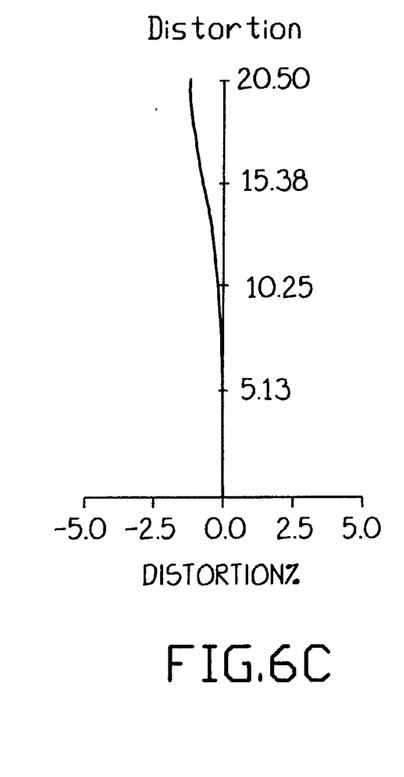

FIGS. 6A to 6C illustrate the aberration characteristics such as spherical aberration, astigmatism and distortion, respectively, of the third preferred embodiment for −2 diopter.

Data for the third preferred embodiment which includes a diopter correcting lens 4 for −3 diopter (see FIG. 4) is shown in Table 8 where the effective focal length is 78.18 mm and the viewing angle is 14.69°.

TABLE 8

| Surface No. | Radius of Curvature (r) | Distance (d) | Refractive Index (Nd) | Abbe Number ($v$) |
|---|---|---|---|---|
| 1' | ∞ | 1.300 | 1.492 | 57.5 |
| 2' | 271.163 | 5.600 | | |
| 1 | ∞ | 1.000 | 1.516 | 64.2 |
| 2 | ∞ | 3.500 | | |
| *3 | −17.599 | 2.000 | 1.585 | 30.9 |
| 4 | −75.924 | 0.500 | | |
| 5 | ∞ | 5.600 | 1.492 | 57.5 |
| *6 | −14.355 | 3.000 | | |

*represents an aspherical surface.

Figure 7A:
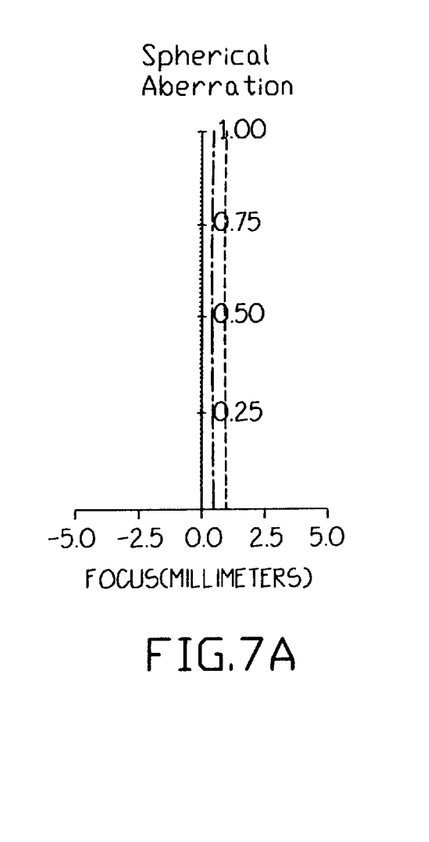
FIGS. 7A to 7C show the aberration curves of a finder system for −3 diopter, in accordance with the third embodiment of the present invention.
Figure 7B:
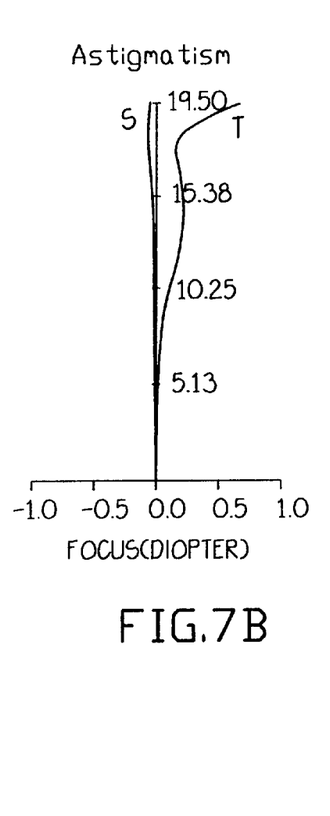
Figure 7C:
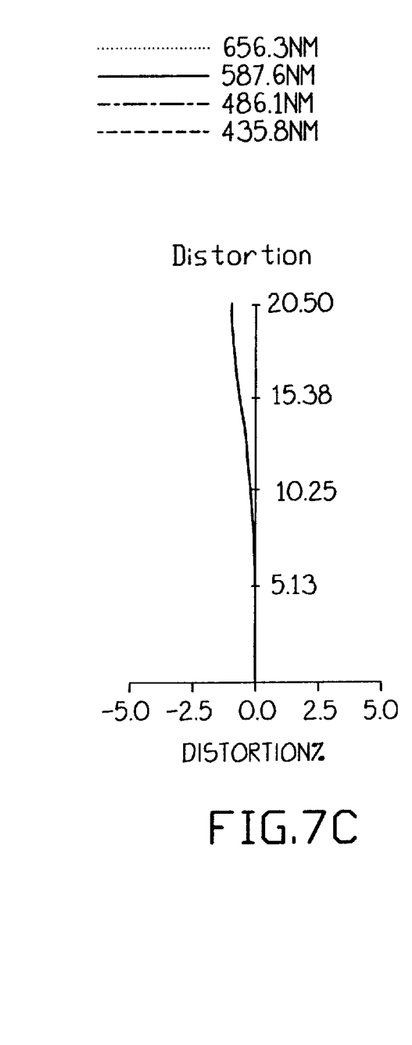

FIGS. 7A to 7C illustrate the aberration characteristics such as spherical aberration, astigmatism and distortion, respectively, of the third preferred embodiment for −3 diopter.

Data for the third preferred embodiment which includes a diopter correcting lens 4 for 0 diopter (see FIG. 4) is shown in Table 9 where the effective focal length is 67.99 mm and the viewing angle is 16.78°.

TABLE 9

| Surface No. | Radius of Curvature (r) | Distance (d) | Refractive Index (Nd) | Abbe Number ($v$) |
|---|---|---|---|---|
| 1' | ∞ | 1.300 | 1.492 | 57.5 |
| 2' | −462.379 | 5.600 | | |
| 1 | ∞ | 1.000 | 1.516 | 64.2 |
| 2 | ∞ | 3.500 | | |
| *3 | −17.599 | 2.000 | 1.585 | 30.9 |
| 4 | −75.924 | 0.500 | | |
| 5 | ∞ | 5.600 | 1.492 | 57.5 |
| *6 | −14.355 | 3.000 | | |

*represents an aspherical surface.

Figure 8A:
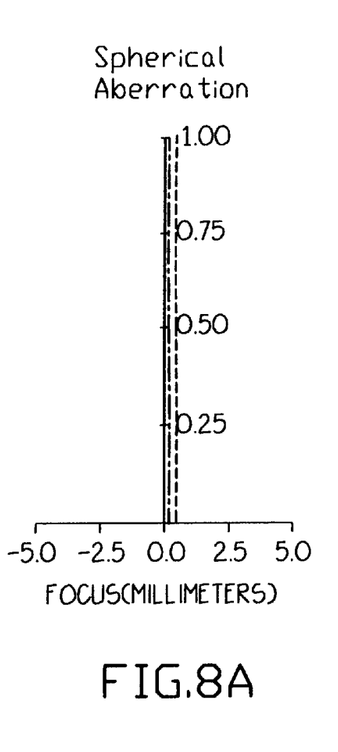
FIGS. 8A to 8C show the aberration curves of a finder system for 0 diopter, in accordance with the third embodiment of the present invention.
Figure 8B:
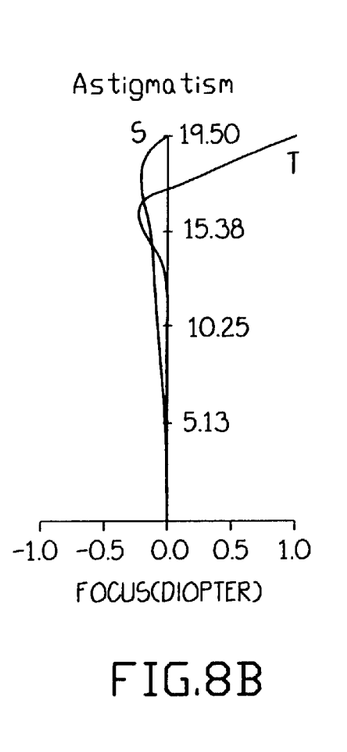
Figure 8C:
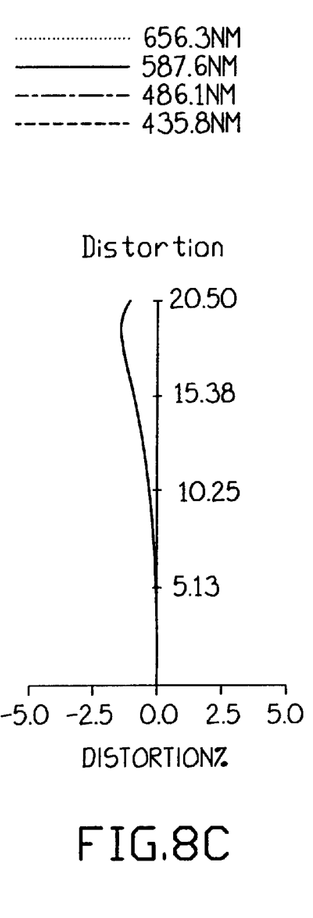

FIGS. 8A to 8C illustrate the aberration characteristics such as spherical aberration, astigmatism and distortion, respectively, of the third preferred embodiment for 0 diopter.

Data for the third preferred embodiment which includes a diopter correcting lens 4 for +1 diopter (see FIG. 4) is shown in Table 10 where the effective focal length is 64.59 mm and the viewing angle is 17.61°.

TABLE 10

| Surface No. | Radius of Curvature (r) | Distance (d) | Refractive Index (Nd) | Abbe Number ($v$) |
|---|---|---|---|---|
| 1' | ∞ | 1.300 | 1.492 | 57.5 |
| 2' | −221.082 | 5.600 | | |
| 1 | ∞ | 1.000 | 1.516 | 64.2 |
| 2 | ∞ | 3.500 | | |
| *3 | −17.599 | 2.000 | 1.585 | 30.9 |
| 4 | −75.924 | 0.500 | | |
| 5 | ∞ | 5.600 | 1.492 | 57.5 |
| *6 | −14.355 | 3.000 | | |

*represents an aspherical surface.

Figure 9A:
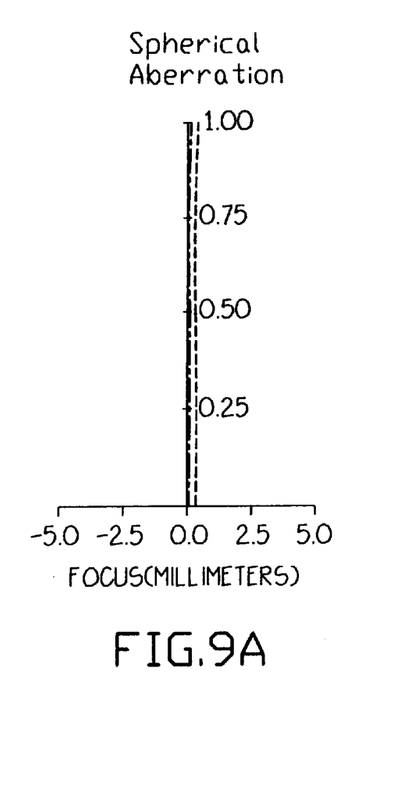
FIGS. 9A to 9C show the aberration curves of a finder system for +1 diopter, in accordance with the third embodiment of the present invention.
Figure 9B:
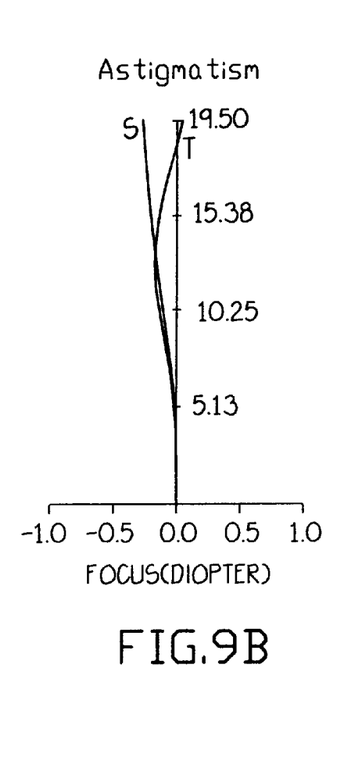
Figure 9C:
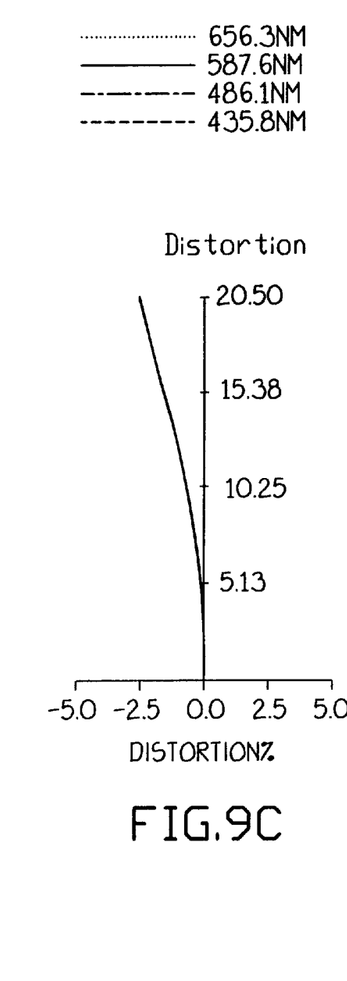

FIGS. 9A to 9C illustrate the aberration characteristics such as spherical aberration, astigmatism and distortion, respectively, of the third red embodiment for +1 diopter.

Data for the third preferred embodiment which includes a diopter correcting lens 4 for +2 diopter (see FIG. 4) is shown in Table 11 where the effective focal length is 61.19 mm and the viewing angle is 18.52°.

TABLE 11

| Surface No. | Radius of Curvature (r) | Distance (d) | Refractive Index (Nd) | Abbe Number ($v$) |
|---|---|---|---|---|
| 1' | ∞ | 1.300 | 1.492 | 57.5 |
| 2' | −139.943 | 5.600 | | |
| 1 | ∞ | 1.000 | 1.516 | 64.2 |
| 2 | ∞ | 3.500 | | |
| *3 | −17.599 | 2.000 | 1.585 | 30.9 |
| 4 | −75.924 | 0.500 | | |
| 5 | ∞ | 5.600 | 1.492 | 57.5 |
| *6 | −14.355 | 3.000 | | |

*represents an aspherical surface.

Figure 10A:
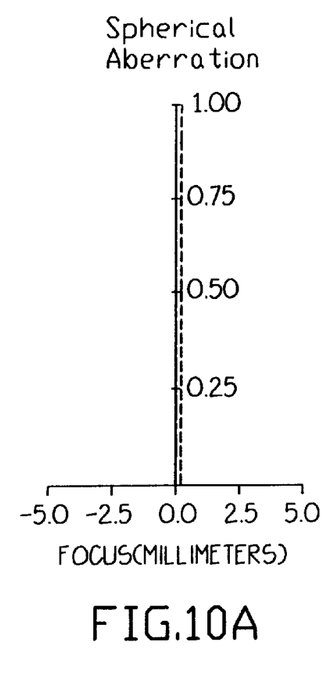
FIGS. 10A to 10C show the aberration curves of a finder system for +2 diopter, in accordance with the third embodiment of the present invention.
Figure 10B:
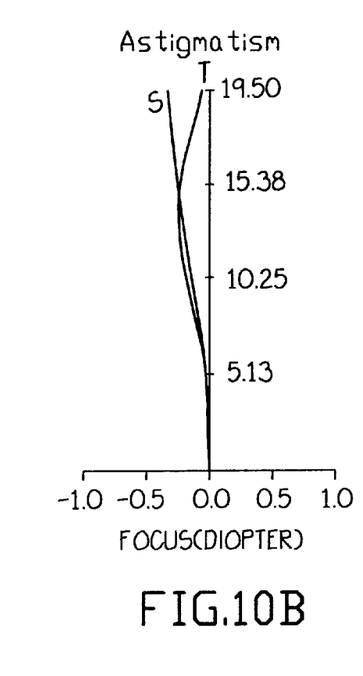
Figure 10C:
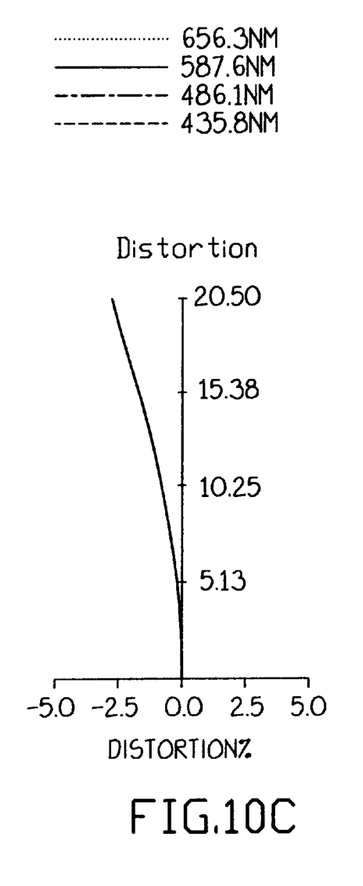

FIGS. 10A to 10C illustrate the aberration characteristics such as spherical aberration, astigmatism and distortion, respectively, of the third preferred embodiment for +2 diopter.

It will be apparent to those skilled in the art that various modifications and variations can be made to the system of the present invention without departing from the spirit and scope of the invention. The present invention covers the modifications and variations of this invention that come within the scope of the appended claims and their equivalents.

What is claimed is:

1. A finder system for a camera comprising:

a focusing screen, having a split prism, on which an image of an object is formed;

a penta roof mirror for reflecting the image formed on the focusing screen; and an eyepiece lens system for viewing the image reflected from the penta roof prism, said eyepiece lens system comprising:

a first lens of a negative refractive power and having a concave surface toward the eye of a user; and a second lens of a positive refractive power and having a convex surface toward said penta roof mirror, wherein said eyepiece lens system satisfies the conditions of:

$29 < v_N < 33$ $55 < v_P < 60$ $-10.0 < (1/r_3 + 1/r_6) \times f < -9.0$ and $1.5 < (|1/r_5 - 1/r_6|)/(|1/r_3 - 1/r_4|) < 1.7$ where $v_N$ represents an Abbe number of said first lens;

$v_P$ represents an Abbe number of said second lens;

f represents an effective focal length of the eyepiece lens system; and each of $r_3$, $r_4$, $r_5$ and $r_6$ respectively represent the radius of curvature of lens surfaces of said first and second lenses in order from the eye of the user, and wherein said first lens is composed of polystyrene and the second lens is composed of acrylic resin.

2. A finder system as recited in claim 1, wherein said eyepiece lens system has at least one aspherical surface.

3. A finder system as recited in claim 1, wherein said eyepiece lens system further comprises a protection lens, mounted in front of said first lens, for protecting said first and second lenses.

4. A finder system as recited in claim 1, further comprising a diopter correcting lens, detachably mounted in front of the eyepiece lens system, for correcting the user's eyesight.

5. A finder system as recited in claim 1, wherein the penta roof mirror includes a hollow housing made of plastic material in the shape of a pentagonal prism.

* * * * *